United States Patent [19]

Karayannis et al.

[11] 3,984,350
[45] Oct. 5, 1976

[54] CATALYST COMPONENT COMPRISING BROWN TITANIUM TRICHLORIDE

[75] Inventors: Nicholas M. Karayannis, Naperville; Harold Grams, Glen Ellyn, both of Ill.

[73] Assignee: Standard Oil Company (Indiana), Chicago, Ill.

[22] Filed: Mar. 31, 1975

[21] Appl. No.: 563,679

Related U.S. Application Data

[63] Continuation-in-part of Ser. No. 468,463, May 9, 1974, abandoned.

[52] U.S. Cl. .............................. 252/429 B; 526/139; 526/140; 526/141; 526/142; 526/149; 526/351
[51] Int. Cl.² ..................................... C08F 4/64
[58] Field of Search ................................ 252/429 B

[56] References Cited
FOREIGN PATENTS OR APPLICATIONS
721,245 2/1972 South Africa Primary Examiner—Patrick P. Garvin
Attorney, Agent, or Firm—Reed F. Riley; Arthur G. Gilkes; William T. McClain

[57] ABSTRACT

A new catalyst component and its use with an organoaluminum compound, which component is a brown solid of high surface area and large pore volume comprising beta titanium trichloride and a small amount of an organic electron pair donor compound. This solid when used in conjunction with an organoaluminum compound to polymerize alpha-olefins produces product polymer at substantially increased rates and yields compared to present commercial, purple titanium trichloride while coproducing reduced amounts of low-molecular-weight and, particularly, amorphous polymer. Combinations of this new catalyst component and an organoaluminum compound can be further improved in their catalytic properties by addition of small amounts of modifiers, alone and in combination. Such combinations with or without modifiers show good sensitivity to hydrogen used as a molecular weight controlling agent. The combinations are useful for slurry, bulk and vapor phase polymerization of alpha-olefins such as propylene.

54 Claims, No Drawings 3,984,350

CATALYST COMPONENT COMPRISING BROWN TITANIUM TRICHLORIDE

RELATED APPLICATIONS

This application is a continuation-in-part of copending application Ser. No. 468,463 filed May 9, 1974, now abandoned.

SUMMARY OF THE INVENTION

This invention relates to a novel brown solid comprising beta titanium trichloride and its use with an organoaluminum compound to polymerize monomers and, more specifically, to a novel brown solid which is a porous, high surface area material comprising beta titanium trichloride and a small amount of an organic electron pair donor compound, and combinations thereof with an organoaluminum compound, which combinations are highly active and useful for polymerizing alpha-olefins, particularly propylene, to normally-solid, crystalline polymeric products in high yields wherein coproduced low-molecular-weight and, particularly, amorphous polymers (solubles) are produced in small amounts.

In accordance with the instant invention a novel porous, high surface area, brown solid comprising beta-crystalline-form titanium trichloride and a minor amount of an organic electron pair donor compound such as an ether is shown, when used with an organoaluminum compound, to be highly effective in polymerizing an alpha-olefin such as propylene. This brown solid when used in combination with an organoaluminum compound, particularly a di-(hydrocarbyl) aluminum chloride, is particularly effective for the polymerization of propylene in that such combinations show exceptionally high polymerization rates and large yields on catalyst and can produce the same or lower solubles (low-molecular-weight and, particularly, amorphous polymer components) when compared to commercial aluminum activated titanium trichloride. Further, the catalyst combinations of the instant invention can be modified with additives which can reduce solubles to a substantially lower level while not substantially affecting the yield on catalyst. Finally, the catalyst combinations taught herein, modified or unmodified, are sensitive to hydrogen used as a chain transfer agent to control the molecular weight of the polymeric product and, additionally, are useful in the slurry, bulk or vapor phase mode of polymerization.

BACKGROUND OF THE INVENTION

Catalyst combinations used for the polymerization of alpha-olefins, particularly propylene, are judged by at least two criteria: their activity and yield on catalyst and their ability to produce highly crystalline polymer product with a minimum of coproduced low molecular weight and, particularly, amorphous polymer. While a number of various factors have been found to play a role in increasing activity and yield and in decreasing solubles, one such factor in catalyst combinations using organoaluminum compounds and titanium trichloride is the crystalline form of the titanium trichloride.

There are apparently four crystalline modifications of titanium trichloride, alpha, beta, gamma, and delta, and the powder diffraction patterns for at least the first three have been given in detail in the literature. The purple crystalline modifications, in particular the gamma form, have been preferred for commercial propylene polymerization, while the brown beta form has been consistently rejected in view of its activity and, particularly, its large production of solubles. However, in U.S. Pat. No. 3,424,774 its use has been claimed for the cyclotrimerization of conjugated diolefinic materials.

Recently, a porous, high surface area titanium trichloride based upon violet, delta titanium trichloride has been disclosed in South African Pat. No. 721,245. In combination with organoaluminum compounds, the catalyst is extremely active and produces high yields of propylene polymer without an accompanying large increase in solubles.

Also, U.S. Pat. No. 3,769,233 describes a method for obtaining a "catalyst consisting of violet $TiCl_3$ . . . from brown $TiCl_3$ produced by the reduction of $TiCl_4$ at a temperature below about 100° C., by contacting brown $TiCl_3$ with $TiCl_4$." The objective is to convert a known, low surface area, brown form of $TiCl_3$ into one of the more polymerization-effective violet forms, which violet forms are generally known for their higher polymerization rates and yields and higher stereospecificities.

In U.S. Pat. No. 3,058,963 polymerization using a "hydrocarbon-insoluble reaction product catalyst component" produced by treatment, for example, of $TiCl_4$ with an alkylaluminum compound in solution is taught.

In U.S. Pat. No. 3,116,274 ethers to promote the stereospecificity of olefin polymerization are used. The preparative process used therein involves mixing an ether, titanium or vanadium tetrachloride and an aluminum alkyl, e.g. aluminum triethyl or sesquichloride, together and combining the reaction product thereof with a promoter for use in alphaolefin polymerization.

Finally, U.S. Pat. No. 3,058,970 teaches improvement of the stereospecificity of olefin polymerization using a catalyst component made by reacting, e.g., titanium tetrachloride and diethylaluminum chloride in the −20° C. to 40° C. temperature range and subsequently aging the result at 40° C. to 150° C.

Now it has been found possible to prepare a highly active, high yield, low solubles producing, brown form of titanium trichloride, despite many literature indications to the contrary, which is very useful as a catalyst component in alpha-olefin polymerization.

STATEMENT OF THE INVENTION

The invention taught herein is a brown solid comprising beta titanium trichloride and some, up to 10 mol percent, of at least one organic electron pair donor compound selected from the group consisting of ethers, thioethers, thiols, ketones, esters, amides, amines, phosphines and stibines, preferably ethers, said brown solid which is predominantly beta titanium trichloride having a surface area of above about 60 square meters per gram and a pore volume of above about 0.10 cc per gram and combinations of such brown solid with an organoaluminum compound, preferably a dialkylaluminum chloride for the polymerization of alpha-olefins, particularly propylene.

This brown solid, in a preferred manner of preparation, is made by the steps of (a) reacting titanium tetrachloride and a di-(hydrocarbyl) aluminum halide, preferably chloride, in a mol ratio, titanium to aluminum compound, of about one to three to about one to five-tenths at a temperature below about 0° C. in the presence of an inert liquid capable of dissolving said titanium tetrachloride; (b) raising the temperature of the product of step (a) to less than about 100° C. for a brief period; (c) combining the solid resulting from step (b) with at least one organic electron pair donor compound selected from the group consisting of ethers, thioethers, thiols, ketones, esters, amides, amines, phosphines and stibines, preferably ethers, in a ratio of about five tenths mol of said donor compound per mol of said solid to about five moles per mol in the presence of an inert liquid capable of dissolving said donor compound and heating the result between above ambient and about 80° C.; (d) treating the product of step (c) with an electron pair acceptor compound selected from the group consisting of titanium tetrahalide, titanium tetraalkoxyhalide, aluminum bromide, germanium tetrachloride and silicon tetrachloride, preferably the titanium tetrachloride, at a temperature between about 40° C. and about 100° C., said acceptor compound dissolved in an inert liquid and forming up to a thirty volume percent solution therein; and (d) isolating from the product of step (d) a porous, high surface area brown solid comprising beta titanium trichloride and some, up to about 10 mol percent, of said organic electron pair donor compound. This solid can be used with an organoaluminum compound, particularly a dialkylaluminum chloride, for the polymerization of alphaolefins, particularly propylene.

The brown solid described herein preferably has a BET surface area larger than about fifty square meters per gram, more preferably, above about 80 square meters per gram and, most preferably, above about 100 square meters per gram. The color, x-ray powder diffraction pattern and chloride to titanium ratio defines the inorganic portion of the brown solid as being substantially titanium trichloride in the beta crystalline modification. Porosity measurements on the brown solid show that it preferably has a pore volume of above about 0.10 cc per gram, more preferably, above about 0.15 cc per gram and, most preferably, above about 0.20 cc per gram.

Investigation of the morphology of the brown solid using electron microscopy shows the solid to be irregularly shaped, somewhat rounded particles which appear to be clusters of still smaller particles.

In a preferred embodiment the brown solid is made as described in the following few paragraphs.

Usefully, any substantially inert liquid medium is used for the preparative and washing steps in the preparation of the brown catalyst component. Alkanes such as pentane, hexane, cyclohexane and the like and halogenated compounds such as chlorobenzene and chloroalkanes may be used after suitable purification to remove water and other polar constituents such as alcohols, mercaptans, etc. More preferably, lower alkanes are the media used and, most preferably, hexane is used.

For the initial preparation step which is reduction of the titanium tetrachloride, a trihydrocarbylaluminum or a di-(hydrocarbyl) aluminum halide is preferred, more preferably, a di-(hydrocarbyl) aluminum chloride may be used, and most preferably, a lower alkyl dialkylaluminum chloride such as diethylaluminum chloride is used. By lower alkyl is meant here an alkyl radical of from one to about eight carbon atoms.

The reduction temperature is best kept below about 0° C while the titanium tetrachloride and organaoaluminum compound are slowly admixed and it is generally maintained for a certain period thereafter. Preferably, admixing is accomplished with agitation. More preferably, a temperature between about −30° C and about 0° C is used and, most preferably, a temperature in the range of about −10° C to about 0° C is used.

The slurry formed by the reduction is thereafter briefly heated at a temperature up to 100° C, more preferably, up to about 80° C. By briefly is here meant more than a few minutes and less than several hours.

The amount of organoaluminum compound used varies with the amount of titanium tetrachloride used and preferably runs from about three mols organoaluminum compound per mol of tetrachloride to about a mol ratio of 0.5:1. More preferably, the ratio varies from about 2:1 to about 0.5:1 and, most preferably, from about 1.5:1 to about 0.75:1.

The solid resulting from the reduction which is essentially a low surface area form of brown titanium trichloride containing small amounts of organoaluminum compounds, is preferably separated and briefly washed, and the result thereof is treated in the presence of an inert liquid medium with at least one organic, electron pair donor compound such as an ether, thioether, thiol, ketone, ester, amide, amine, phosphine or stibine. Preferably, said at least one donor compound is an ether, thioether, thiol or ketone and, more preferably, said donor compound is at least one ether such as n-butyl, isobutyl, cyclohexyl, isopentyl or octyl ether and the like, or an ether in which the organic groups are of a mixed nature such as isobutylisopentyl ether, isopentylphenyl ether etc. Most preferably, said donor compound is at least one lower alkyl ether is at least one alkyl ether in particular a lower alkyl ether such as isopentyl ether or a mixture of isopentyl and n-butyl ethers. By lower alkyl is meant here alkyl groups having two to about eight carbon atoms.

In general, the reactants in the electron pair donor compound addition step are added at about ambient temperature and the result thereof heated between about ambient and about 80° C. More preferably, the heating is accomplished at a temperature in the range from about 30° C to about 70° C and, most preferably, the heating is done at about 35° C to about 50° C.

The amount of said at least one organic electron pair donor compound which is added to the separated and washed solid from the first step preferably runs between about 0.5 mols compound per mol of titanium contained in said solid to about 5 mols per mol. More preferably, it varies between about two mols of said at least one organic electron pair donor compound per mol of titanium contained in said solid and about 0.75 mols per mol, and, most preferably, the mol ratio may vary from about 1.5:1 to 0.9:1.

The heating period of the above step preferably varies between about 10 minutes and a few hours with 15 minutes to two hours being more preferred.

After the above treatment with said at least one organic electron pair donor compound, the solid product from this second reaction step is preferably separated and washed with an inert liquid medium.

The solid product resulting from such second step which is essentially a brown, low surface area form of titanium trichloride containing small amounts of organoaluminum compounds and some of the donor compound is then treated with an electron pair acceptor compound for a few minutes to a few hours, preferably fifteen minutes to several hours, in contact with an inert liquid medium. The temperature range of this heating varies from about ambient temperature to about 100° C, preferably about 30° C to about 80° C, and, more preferably, about 40° C to about 70° C.

The electron pair acceptor compound is preferably a Lewis acid compound which is soluble in the inert liquid medium such as titanium tetrahalide, titanium alkoxyhalide, aluminum bromide, germanium tetrachloride, silicon tetrachloride and other periodic group IVB, IVA and VA halides. More preferably, the electron acceptor pair compound is titanium tetrachloride, germanium tetrachloride or silicon tetrachloride, and, most preferably, it is titanium tetrachloride.

The process of treating the solid material from step two with the electron pair acceptor compound in solution is preferably carried out using a mol ratio of said acceptor compound to titanium contained in said solid of about 10:1 to about 0.5:1. More preferably, it runs from a mol ratio of about 5:1 to about 0.5:1 and, most preferably, a mol ratio of about 3:1 to about 1:1 is used. It is important here not to use a highly concentrated solution of the electron pair acceptor compound. A 5 to 30 volume percent solution is preferable and, more preferably, the lower limit is about 10 volume percent.

The brown solid resulting from this third process step is then separated, preferably washed, and used in conjunction with an organo-aluminum compound such as an aluminum trialkyl or a dialkylaluminum halide, preferably a dialkylaluminum chloride, for polymerizing alpha-olefins. Preferably, a lower alkyl, dialkylaluminum chloride is used.

The catalyst combination of an organoaluminum compound and the brown solid may be used for slurry, bulk phase or vapor phase alpha-olefin polymerization with excellent results.

Although the catalyst component and organoaluminum compound are preferably used for propylene polymerization to form highly crystalline polypropylene it may be used for other $C_2$ to $C_{10}$ terminal olefins as well, e.g., ethylene 1-butene, 1-pentene, 4 methyl-pentene-1, vinylcyclohexane, etc. and, additionally, for preparing highly crystalline terminal block and pure block types of copolymers of propylene and a second alpha-olefin or propylene and ethylene.

The polymerization conditions of temperature, pressure and concentrations used for the catalyst combinations described herein are generally those known previously to or easily determined by those skilled in the art of alpha-olefin polymerization.

In glass bottle slurry propylene polymerizations with the brown catalyst compound polymer during formation and up to the kill step can be seen to have a distinct brown coloration unlike the purple to pink coloration present when a purple form of $TiCl_3$ such as $AATiCl_3$ is used in the same type of polymerization. Also, polypropylene produced by the brown catalyst component in a bulk process is composed of exclusively opaque polymer particles. This is true also for polypropylene made with the brown catalyst component in a slurry process. In bulk propylene polymerizations using the brown catalyst component with $R_2AlCl$ it has been found that roughly three-quarters of the material defined herein as hexane extractables is removed by simply slurrying the product powder with hexane for two hours at 70° C.

The solubles or extractables may be further reduced by modifying the instant catalyst combination with at least one modifier such as an amine, preferably, a sterically hindered cyclic amine, an amine oxide, an ether, an organic phosphite, a polyether such as diglyme and the like. Mixtures of alkyltin sulfides such as bis-(tributyl)tin sulfide with an amine, amine oxide or organic phosphite or mixtures of hydrogen sulfide with an amine, amine oxide or organic phosphite are also useful to further reduce solubles. The latter mixtures appear particularly good in reducing solubles with only a slight effect upon polymer yield.

While the invention is described in connection with the specific EXAMPLES below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

All solvents and polymerization media used were treated to remove water and other polar materials prior to use herein.

The powder x-ray diffraction measurements were carried out on material in sealed glass tubes in the usual way using a diffractometer. Porosity measurements were made using an American Instrument Company, Silver Springs, Md., high pressure mercury porosimeter (60,000 p.s.i.).

Surface area measurements were accomplished employing the one point BET method using a 10 percent nitrogen-90 percent helium mixture. The sample was pretreated at ambient for about 1 hour in a slow stream of the above gas mixture, then cooled to liquid nitrogen temperature for about 45 minutes for nitrogen adsorption and finally warmed to ambient and the composition of the desorbed gas measured with a thermal conductivity detector.

Chemical analyses were performed by dissolving weighed catalyst samples in methanol or water acidified with sulfuric acid. Aliquots of the above solutions were used to determine titanium and aluminum by atomic absorption and chlorine by a Volhard titration. The ether was determined by neutralizing the methanol solutions or extracting the aqueous solutions with hexane and injecting the results into a gas chromatography column which had been calibrated with standard solutions containing the relevant ether.

The brown catalyst component described herein forms a purple solution when decomposed by dissolution in dilute sulfuric acid and a blue solution when decomposed by dissolution in $MeOH-H_2SO_4$ mixtures.

Slurry rates are grams of crystalline polymer (total polymer minus solubles) per gram of brown solid (calculated as $TiCl_3$) per hour of polymerization. Bulk rates are grams total polymer per gram of brown solid (calculated as $TiCl_3$) per hour of polymerization.

The weight under EXAMPLE No. and Weight is the weight of brown solid used. When calculating mols of brown solid the small organic content was generally neglected.

EXAMPLE I

A 24.6 milliliter portion of dry hexene and 12.5 milliliters of titanium tetrachloride were added to a 300 milliliter round bottom flask. The flask and its contents were protected under a blanket of dry nitrogen throughout the preparation. The solution was stirred with a magnetic stirring bar and cooled in an ice bath maintained at −1° C. A 74.8 milliliter portion of diethylaluminum chloride in hexane (24.4 weight percent diethylaluminum chloride, solution density 0.739 grams/milliliter) was added dropwise to the titanium tetrachloride solution over a three hour period. After the alkyl addition was complete, the slurry was stirred at −1° C for 15 minutes, fitted with a condenser, and then heated to 65° C within one hour. The slurry was stirred at 65° C for 1 hour. After cooling to room temperature, the solid was washed with five 42 milliliter portions of dry hexane by decantation with the last wash performed at 65° C.

The solid was decanted, 144 milliliters of dry hexane and 21.3 milliliters isopentyl ether added, and the slurry stirred at 35° C for 1 hour. The solid was then washed with five 42 milliliter portions of dry hexane by decantation.

A 70.8 milliliter portion of a 20.3 volume percent stock solution of titanium tetrachloride in hexane (46.3 milliliters titanium tetrachloride plus 181.8 milliliters hexane) was added to the decanted solid. The slurry was stirred at 62°–65° C for two hours and cooled to room temperature. The solid was washed with five 42 milliliter portions of dry hexane by decantation with the last wash performed at 65°C. The solid was decanted and 50 milliliters of dry hexane added. A 1.0 milliliter portion of the final slurry contained 0.295 grams of brown solid.

A powder x-ray diffraction pattern taken on the dry brown colored solid shows peaks corresponding to 5.8 w, 5.4 s, 2.89 w, 2.77 s b, 2.15 m, 1.96 w, 1.78 m-s b, 1.48 w vb, 1.14 vvw.

A surface area measurement made on the dry, brown solid indicates the material has a surface area of about 106 sq. meters per gram.

An analysis of the brown colored solid showed that it contained 22.5 percent titanium, 0.6 percent aluminum, 59.8 percent chlorine and 10.0 percent isopentyl ether.

EXAMPLE II

A 49.2 milliliter portion of dry hexane and 25 milliliters of titanium tetrachloride were added to a 50 milliliter round bottom flask. The flask and its contents were protected under a blanket of dry nitrogen throughout the preparation. The solution was slowly stirred with a magnetic stirring bar and cooled in an ice bath maintained at −1° C. A 149.6 milliliter portion of diethylaluminum chloride in hexane (24.4 weight percent diethylaluminum chloride, solution density 0.739 grams/milliliter) was added dropwise over a 3 hour period. After the alkyl addition was complete the slurry was slowly stirred at −1° C for 15 minutes, fitted with a condenser, and then heated to 65° C within an hour. The slurry was slowly stirred at 65° C for 1 hour. After cooling to room temperature the solid was washed with five 84 milliliter portions of dry hexane by decantation with the last wash performed at 65° C.

The solid was decanted, 288 milliliters of hexane and 42.6 milliliters of isopentyl ether added, and the slurry slowly stirred at 35° C for 1 hour. The solid was then washed with five 84 milliliter portions of dry hexane, and the resulting slurry split into four equal parts.

One of the parts was decanted, and 54.5 milliliters of a 13 volume percent titanium tetrachloride solution in hexane was added to the solid. The slurry was slowly stirred at 65° C for 2 hours and cooled to room temperature. The solid was washed with five 25 milliliter portions of dry hexane by decantation with the last wash performed at 65° C. The solid was decanted and 50 milliliters of additional hexane was added. A 1.0 milliliter portion of the final slurry contained 0.141 grams of brown solid.

A powder x-ray diffraction pattern taken on the dry, brown solid shows peaks corresponding to 5.8 w, 5.4 s, 2.75 b s, 2.14 m, 2.00 m-s, 1.96 w, 1.77 bs, 1.52 w, 1.49 vw, 1.13 vw.

An analysis of the brown solid showed that it contains 26.6 percent titanium, 0.6 percent aluminum, 58.2 percent chlorine and 9.5 percent isopentyl ether.

EXAMPLE III

The procedure of this EXAMPLE is the same as EXAMPLE II except that, after the slurry was divided into four equal parts, one of the parts was decanted, and 35.4 milliliters of a 20.3 volume percent titanium tetrachloride solution in hexane added to the solid. The slurry was slowly stirred at 65° C for 105 minutes and cooled to room temperature. The solid was washed with five 25 milliliter portions of dry hexane by decantation with the last wash being performed at 65° C. The solid was decanted and 50 milliliters of hexane added. A 1.0 milliliter portion of the final slurry contained 0.158 grams of brown solid.

A powder x-ray diffraction pattern taken on the dry brown solid shows peaks corresponding to 5.9 vw, 5.4 s, 2.9 w, 2.75 b s, 2.12 m, 1.99 m-s, 1.95 w, 1.77 w, and 1.48 w.

An analysis of the brown solid showed that it contains 26.2 percent titanium, 0.7 percent aluminum, 59.4 percent chlorine and 6.3 percent of isopentyl ether.

EXAMPLE IV

The procedure of this EXAMPLE is the same as EXAMPLE I except that, after the solid was washed with five 42 milliliter portions of dry hexane by decantation, 35.4 milliliters of a 20.3 volume percent titanium tetrachloride solution in hexane was added to the solid. The slurry was slowly stirred at 65° C for 105 minutes and cooled to room temperature. The solid was washed with five 25 milliliter portions of dry hexane by decantation with the last wash being performed at 65° C. The solid was decanted and 50 milliliters of hexane was added. A 1.0 milliliter portion of the final slurry contained 0.158 grams of brown colored solid.

EXAMPLE V

The procedure of this EXAMPLE is the same as EXAMPLE IV except that treatment of the titanium trichloride-isopentylether complex was made with a 40 volume percent in hexane solution of germanium tetrachloride.

EXAMPLE VI

The propylene polymerizations of this EXAMPLE were carried out in a pressure bottle at 40 p.s.i.g. and 70° C in 2 hour runs using the below indicated amounts of brown catalyst component, 1.0 milliliter of 24.4 weight percent diethylaluminum chloride and 200 milliliters of hexane polymerization medium.

TABLE

| EXAMPLE No. and Weight (grams) | Rate (grams/gram/hour) | Solubles (%) |
|---|---|---|
| I 0.0875 | 253 | 10.9 |
| I 0.0875 | 219 | 2.5* |
| IV 0.0754 | 213 | 5.4 |
| II 0.0843 | 165 | 6.0 |
| V 0.099 | 106 | 19.6 |
| III 0.0948 | 195 | 5.7 |
| **0.2 | 65 | 6.0 |

TABLE-continued

| EXAMPLE No. and Weight (grams) | Rate (grams/gram/hour) | Solubles (%) |
|---|---|---|
| **0.2 | 35 | 2.2* |

*To these polymerizations 0.008 milliliters of bis-(tributyl)tin sulfide, BTS, and 0.004 milliliter of 2,4,6-collidine, Coll, was added.
**Commercially available AATiCl₃ purchased from Stauffer Chemical Company was used in these runs instead of the brown titanium trichloride.

EXAMPLE VII

The polymerizations of this EXAMPLE were carried out at 160° F for about 1 hour in a one gallon reactor at over 250 p.s.i.g. propylene pressure and a small hydrogen partial pressure using 1200 milliliters of hexane as a polymerization medium. The catalyst used was diethylaluminum chloride, brown titanium trichloride, BTS and Coll in a 2.8/1.0/0.014/0.027 molar ratio.

TABLE

| EXAMPLE No. and Weight (grams) | Rate (grams/gram/hour) | Solubles (%) |
|---|---|---|
| III 0.1 | 2002 | 2.1** |
| IV 0.1 | 2170 | 4.2 |
| IV 0.1 | 2226 | 2.5 |
| IV 0.1 | 2320 | 1.5** |
| III 0.1 | 1215 | 3.3**,*** |
| IV 0.1 | 1422 | 4.4*** |
| IV 0.1 | 1583 | 1.7**,*** |
| * 0.4 | 628 | 2.6 |
| * 0.4 | 401 | 4.6*** |

*AATiCl₃ purchased from Stauffer Chemical Company.
**Run at a 2.8/1/0.028/0.054 molar ratio, diethylaluminum chloride, titanium trichloride, BTS and Coll.
***Four hour runs.

EXAMPLE VIII

The following liquid phase (bulk) propylene polymerizations were carried out in a one liter reactor for two hours at 160° F using 460 pounds propylene pressure and a small amount of hydrogen. In each run 0.3 milliliter of a 24.4 weight percent diethylaluminum chloride in hexane solution was used.

TABLE

| EXAMPLE No. and Amount (grams) | Rate (grams/gram/hour) | Solubles (%) | Extractables (%) |
|---|---|---|---|
| IV 0.03 | 3084 | 4.8 | 11.0 |
| IV 0.03 | 3187 | 1.6 | 4.6** |
| II 0.021 | 2390 | 1.3 | 4.2** |
| IV 0.028 | 2322 | 0.9 | 2.7**,*** |
| * 0.05 | 1186 | 4.3 | 6.8 |
| * 0.05 | 797 | 3.3 | 3.8 |

*AATiCl₃ purchased from Stauffer Chemical Company.
**0.0025 milliliters BTS and 0.00125 milliliters Coll used.
***0.32 milliliters of a 24.4 weight percent diethylaluminum chloride in hexane solution.

EXAMPLE IX

A stock solution of brown catalyst component was made by adding 80 milliliters of hexane and 40 milliliters of titanium tetrachloride to a 500 milliliter flask and cooling to 0° C. A 247 milliliter portion of 24.4 weight percent diethylaluminum chloride (0.739 grams/milliliter) was added to this solution over a 3 hour period. The slurry formed was warmed to ambient, heated to 65° C for 1 hour and then washed. Finally, the concentration of the slurry was determined. A twenty five milliliter portion of the latter slurry (about six grams of solid) was added to a two hundred milliliter flask, decanted, and forty milliliters of hexane added. An 8.8 milliliter portion of octyl ether was added and the slurry heated at 35° C for 1 hour. The result was then wshed with hexane.

The solid was decanted from the latter slurry and 12 milliliters of hexane and four milliliters of titanium tetrachloride added to the decanted solid. This mixture was then heated at 65° C for 2 hours, the brown solid resulting washed with hexane and aliquots of the slurry used for polymerization.

EXAMPLE X

A stock solution of brown catalyst component was made as in EXAMPLE IX except:
1. A 24.6 milliliter portion of hexane and 12.5 milliliters of titanium tetrachloride were cooled to 0° C and 74.8 milliliters of diethylaluminum chloride were added.
2. To the washed solid from (1) above, 144 milliliters of hexane and 20.1 milliliters of benzylisopentyl ether were added.
3. A 60.4 milliliter portion of an 11.9 volume percent solution of titanium tetrachloride in hexane was added to the solid of (2) above.

EXAMPLE XI

EXAMPLE X was repeated except that in step (3) a 79.5 milliliter portion of a 9.04 volume percent titanium tetrachloride in hexane solution was employed.

EXAMPLE XII

A stock solution of brown catalyst component was made as in EXAMPLE IX except:
1. A 196.8 milliliter portion of hexane and 100 milliliters of titanium tetrachloride were cooled to 0° C and 594.8 milliliters of a 25 percent Et₂AlCl solution was added. To the washed and decanted solid four hundred milliliters of hexane was added.
2. To 50 milliliters of the slurry from (1) was added 181 milliliters of hexane, 14.2 milliliters of isopentylether and 5.9 milliliters of n-butylether.
3. To the washed solid of (2) was added 56 milliliters of hexane and 14.2 milliliters of titanium tetrachloride.

EXAMPLE XIII

A stock solution of brown catalyst component was made as in EXAMPLE XII except that 15.4 milliliters of isobutylvinyl ether was used rather than the isopentyl and n-butyl ethers.

EXAMPLE XIV

A stock solution of brown catalyst component was made as in EXAMPLE XII except that 11.8 milliliters of anisole was used rather than the isopentyl and n-butyl ethers.

EXAMPLE XV

The following slurry polymerizations were carried out at 70° C and at 40 p.s.i.g. propylene pressure for 2 hours in pressure bottles using 80 milligrams of EXAMPLE IX brown solid, 182 milligrams of Et₂AlCl, 9.5 milligrams BTS and 3.7 milligrams Coll.

TABLE

| EXAMPLE No. | Rate (grams/gram/hour) | Solubles (%) |
|---|---|---|
| IX* | 61 | 3.2 |

*Control is a isopentyl ether containing brown catalyst component made by a procedure similar to those in EXAMPLES I through IV having a rate of 178 and solubles of 1.3%.

EXAMPLE XVI

The following slurry polymerizations were carried out as in EXAMPLE XV except no BTS or Coll was used and about 0.08 grams of brown catalyst component and one milliliter of 25 percent Et$_2$AlCl solution was employed.

TABLE

| EXAMPLE No. | Rate (grams/gram/hour) | Solubles (%) |
|---|---|---|
| X* | 68.5 | 20.3 |
| XI* | 51.7 | 21.5 |
| XII*** | 161 | 4.2 |
| XIII** | 58 | 17.2 |
| XIV** | 65 | 15.5 |

Controls are all isopentyl ether containing brown catalyst components made by procedures similar to those in EXAMPLES I through IV.
*Control; rate 165, solubles 6.1
**Control; rate 157, solubles 5.8
***Control; rate 170, solubles 5.4

EXAMPLE XVII

The following slurry polymerizations were carried out as in EXAMPLE XVI except that 0.008 milliliters BTS and 0.004 milliliters Coll were used.

TABLE

| EXAMPLE No. | Rate (grams/gram/hour) | Solubles (%) |
|---|---|---|
| XII | 159 | 1.2 |
| XIII | 55 | 11.6 |
| XIV | 56 | 7.2 |

*Controls for XII, XIII and XIV are brown catalyst components containing isopentyl ether made by procedures similar to those in EXAMPLES I through IV having rates and solubles of 178 and 1%, 164 and 1.2% and 164 and 1.2% respectively.

EXAMPLE XVIII

The brown catalyst component of this EXAMPLE was made by the procedure of EXAMPLE I with the following amounts of reagents:
1. 196.8 milliliters of hexane
   100 milliliters of titanium tetrachloride
   598.4 milliliters of Et$_2$AlCl
   336 milliliters of hexane in each wash
2. 1,152 milliliters of hexane
   170 milliliters of isopentylether
   336 milliliters of hexane in each wash
3. 448 milliliters of hexane added separately from
   113.6 milliliters of titanium tetrachloride
   336 milliliters of hexane in each wash The resulting brown solid has a surface area of 147 square meters per gram and a pore volume of 0.197 cc per gram. Analysis shows that it contains 26.0% Ti, 58.5% Cl, 0.36% Al and 6.41% isopentyl ether. A powder x-ray pattern shows peaks corresponding to 5.9 m, 5.4 s, 2.75 vs br, 2.13 w, 1.98 m, 1.94 w, 1.77 m br, 1.72 w, 1.47 w br, 1.23 w, 1.13 w br.

EXAMPLE XIX

The brown catalyst component of this EXAMPLE was made in the same way as the last EXAMPLE. The resulting brown solid has a surface area of 101 square meters per gram and a pore volume of 0.193 cc per gram. Analysis shows that it contains 26.8% Ti, 60.0% Cl, 0.36% Al and 6.26% isopentyl ether.

EXAMPLE XX

The brown catalyst component of this EXAMPLE was made in the same way as the last EXAMPLE except the isopentyl ether was distilled over sodium prior to use. The resulting brown solid has a surface area of 89 square meters per gram and a pore volume of 0.188 cc per gram.

EXAMPLE XXI

The propylene polymerizations of this EXAMPLE were run as in EXAMPLE VI.

TABLE

| EXAMPLE No. and Weight (grams) | Rate (grams/gram/hour) | Solubles (%) |
|---|---|---|
| Ex. XVIII  0.08 | 259 | 5.0 |
|            0.08 | 263 | 3.9 |
| Ex. XIX    0.08 | 264 | 5.7 |
|            0.08 | 240 | 5.2 |
| Ex. XX     0.08 | 173 | 6.4 |
|            0.08* | 168 | 1.4 |

*0.008 milliliters of BTS and 0.004 milliliters of Coll used.

EXAMPLE XXII

The propylene polymerizations of this EXAMPLE were run as in EXAMPLE VIII.

TABLE

| EXAMPLE No. and Weight*** (grams) | Rate (grams/gram/hour) | Extractables (%) |
|---|---|---|
| Ex. XVIII  0.05* | 3065 | 3.6 |
|            0.05** | 2276 | 3.8 |
| Ex. XIX    0.05* | 1766 | 2.9 |
|            0.05** | 1393 | 2.8 |

*2 hour run
**4 hour run
***Brown solid/Et$_4$AlCl/BTS/Coll ratio used is 1.0/3.0/0.03/0.06

What is claimed is:

1. A brown solid comprising beta titanium trichloride and some, up to 10 mol percent, of at least one organic electron pair donor compound selected from the group consisting of hydrocarbyl ethers, thioethers, thiols, ketones, esters, amides, amines, phosphines and stibines, said brown solid having a surface area of above about fifty square meters per gram and a pore volume of above about 0.10 cc/gram.

2. The brown solid of claim 1 wherein said at least one organic electron pair donor compound is selected from the group consisting of ethers.

3. The brown solid of claim 1 wherein said at least one organic electron pair donor compound is one such compound and is an ether.

4. The brown solid of claim 2 wherein said ethers are lower alkyl ethers.

5. The brown solid of claim 3 wherein said ether is a lower alkyl ether.

6. The brown solid of claim 4 wherein said lower alkyl ethers are isopentyl ether and n-butyl ether.

7. The brown solid of claim 5 wherein said lower alkyl ether is isopentyl ether.

8. The brown solid of claim 4 wherein said surface area is above about eighty square meters per gram and said pore volume is above about 0.15 cc per gram.

9. The brown solid of claim 5 wherein said surface area is above about eighty square meters per gram and said pore volume is above about 0.15 cc per gram.

10. The brown solid of claim 6 wherein said surface area is above about eighty square meters per gram and said pore volume is above about 0.15 cc per gram.

11. The brown solid of claim 7 wherein said surface area is above about eighty square meters per gram and said pore volume is above about 0.15 cc per gram.

12. An olefin polymerization catalyst comprising an alkylaluminum compound and said brown solid of claim 1.

13. An olefin polymerization catalyst comprising an alkylaluminum compound and said brown solid of claim 2.

14. An olefin polymerization catalyst comprising an alkylaluminum compound and said brown solid of claim 3.

15. An olefin polymerization catalyst comprising an alkylaluminum compound and said brown solid of claim 4.

16. An olefin polymerization catalyst comprising an alkylaluminum compound and said brown solid of claim 5.

17. An olefin polymerization catalyst comprising an alkylaluminum compound and said brown solid of claim 6.

18. An olefin polymerization catalyst comprising an alkylaluminum compound and said brown solid of claim 7.

19. An olefin polymerization catalyst comprising a dialkylaluminum chloride and said brown solid of claim 4.

20. An olefin polymerization catalyst comprising a dialkylaluminum chloride and said brown solid of claim 5.

21. An olefin polymerization catalyst comprising a dialkylaluminum chloride and said brown solid of claim 6.

22. An olefin polymerization catalyst comprising a dialkylaluminum chloride and said brown solid of claim 7.

23. A process comprising:
   a. reacting titanium tetrachloride and a tri-(hydrocarbyl-aluminum, a di-(hydrocarbyl)aluminum bromide or a di-(hydrocarbyl)aluminum chloride in a mol ratio within the range of about one mol titanium compound to one-half to three mols aluminum compound at a temperature below about 0° C. in the presence of an inert liquid solvent for said titanium tetrachloride to form a brown solid;
   b. raising the temperature of the product of (a) to less than about 100° C;
   c. incorporating the brown solid of (b) in the presence of an inert liquid solvent for organic electron pair donor compounds with at least one of said donor compounds selected from the group consisting of hydrocarbyl ethers, thioethers, thiols, ketones, esters, amides, amines, phosphines and stibines in a mol ratio within the range of aout one-half to five mols of said donor compound per mol of titanium contained in said brown solid of (b);
   d. heating the product of (c) between about ambient and about 80° C.;
   e. treating the brown solid of (d) at a temperature between about 40° C and about 100° C with a solution in an inert liquid of an electron pair acceptor compound which is a titanium tetrahalide, a titanium alkoxyhalide, aluminum bromide, germanium tetrachloride or silicon tetrachloride at conditions of temperature, time, concentration of said acceptor compound dissolved in said inert liquid solvent, and mol ratio of acceptor compound to titanium contained in said brown solid of (d) which convert said brown solid of (d) into a brown solid having a surface area of above about fifty square meters per gram and a pore volume of above about 0.10 cc/gram; and
   f. recovering from (e) a solid polymerization catalyst component comprising brown, beta titanium trichloride containing up to about ten mol percent of said at least one organic electron pair donor compound, said component having a surface area of above about fifty square meters per gram and a pore volume of above about 0.10 cc/gram.

24. The process of claim 23 wherein said tri-(hydrocarbyl)aluminum, di-(hydrocarbylaluminum) bromide or chloride of (a) is a lower alkyl, dialkylaluminum chloride.

25. The process of claim 24 wherein said at least one organic electron pair donor compound is selected from the group consisting of ethers.

26. The process of claim 24 wherein said at least one organic electron pair donor compound is one such compound and is an ether.

27. The process of claim 25 wherein said electron paid acceptor compound is titanium tetrachloride.

28. The process of claim 26 wherein said electron pair acceptor compound is titanium tetrachloride.

29. The process of claim 27 wherein said ethers are lower alkyl ethers.

30. The process of claim 28 wherein said ether is a lower alkyl ether.

31. The process of claim 29 wherein said lower alkyl ethers are isopentyl ether and n-butyl ether.

32. The process of claim 30 wherein said lower alkyl ether is isopentyl ether.

33. An olefin polymerization catalyst comprising an alkylaluminum compound and said catalyst component of claim 23.

34. An olefin polymerization catalyst comprising an alkylaluminum compound and said catalyst component of claim 24.

35. An olefin polymerization catalyst comprising an alkylaluminum compound and said catalyst component of claim 25.

36. An olefin polymerization catalyst comprising an alkylaluminum compound and said catalyst component of claim 26.

37. An olefin polymerization catalyst comprising an alkylaluminum compound and said catalyst component of claim 27.

38. An olefin polymerization catalyst comprising an alkylaluminum compound and said catalyst component of claim 28.

39. An olefin polymerization catalyst comprising an alkylaluminum compound and said catalyst component of claim 29.

40. An olefin polymerization catalyst comprising an alkylaluminum compound and said catalyst component of claim 30.

41. An olefin polymerization catalyst comprising an alkylaluminum compound and said catalyst component of claim 31.

42. An olefin polymerization catalyst comprising an alkylaluminum compound and said catalyst component of claim 32.

43. An olefin polymerization catalyst comprising a dialkylaluminum chloride and said catalyst component of claim 29.

44. An olefin polymerization catalyst comprising a dialkylaluminum chloride and said catalyst component of claim 30.

45. An olefin polymerization catalyst comprising a dialkylaluminum chloride and said catalyst component of claim 31.

46. An olefin polymerization catalyst comprising a dialkylaluminum chloride and said catalyst component of claim 32.

47. An olefin polymerization catalyst comprising an alkylaluminum compound and said brown solid of claim 8.

48. An olefin polymerization catalyst comprising an alkylaluminum compound and said brown solid of claim 9.

49. An olefin polymerization catalyst comprising an alkylaluminum compound and said brown solid of claim 10.

50. An olefin polymerization catalyst comprising an alkylaluminum compound and said brown solid of claim 11.

51. An olefin polymerization catalyst comprising a dialkylaluminum chloride and said brown solid of claim 8.

52. An olefin polymerization catalyst comprising a dialkylaluminum chloride and said brown solid of claim 9.

53. An olefin polymerization catalyst comprising a dialkylaluminum chloride and said brown solid of claim 10.

54. An olefin polymerization catalyst comprising a dialkylaluminum chloride and said brown solid of claim 11.

* * * * *

UNITED STATES PATENT OFFICE
CERTIFICATE OF CORRECTION

Patent No. 3,984,350            Dated October 5, 1976

Inventor(s) Nicholas M. Karayannis, Harold Grams

It is certified that error appears in the above-identified patent and that said Letters Patent are hereby corrected as shown below:

Column 3, line 18   "(d)" should be -- (e) --

"    3    "   64,65   "organaoaluminum" should be -- organoaluminum

"    5    "     47   "compound" should be -- component

"    10    "      6   "wshed" should be -- washed

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*